United States Patent [19]

Tsuchiya

[11] 4,157,021
[45] Jun. 5, 1979

[54] TORQUE ADJUSTER

[75] Inventor: Yukikazu Tsuchiya, Kamakura, Japan

[73] Assignee: Nippon Kogaku K.K., Tokyo, Japan

[21] Appl. No.: 851,747

[22] Filed: Nov. 15, 1977

[30] Foreign Application Priority Data

Nov. 25, 1976 [JP] Japan .................. 51-156998[U]

[51] Int. Cl.² .................. F16D 7/02; G02B 21/26
[52] U.S. Cl. .................. 64/30 C; 64/30 A; 64/30 E
[58] Field of Search ............ 64/30 C, 30 E, 30 A; 350/84, 86

[56] References Cited

U.S. PATENT DOCUMENTS

| | | | |
|---|---|---|---|
| 2,560,169 | 7/1951 | Gradisar | 350/84 |
| 2,820,396 | 1/1958 | Pressey | 350/84 |
| 3,024,630 | 3/1962 | Billups | 64/30 A |
| 3,451,739 | 6/1969 | Fitzgibbons | 350/84 |
| 3,826,559 | 7/1974 | Berliner | 350/86 |
| 4,003,628 | 1/1977 | Halperin | 64/30 C |

Primary Examiner—Charles J. Myhre
Assistant Examiner—R. C. Turner
Attorney, Agent, or Firm—Fitzpatrick, Cella, Harper & Scinto

[57] ABSTRACT

In a torque adjuster including a rotary shaft, a first handle or knob fitted to the rotary shaft for rotating the same shaft, a stationary member, and a first friction member provided between the first knob and the stationary member, the first knob being movable axially of the rotary shaft to vary the force with which the first knob urges the friction member, thereby adjusting the torque of the first knob, the diameter of the rotary shaft is made uniform over a predetermined range thereof so that the first knob is freely movable axially of the rotary shaft. A second friction member is provided to couple the first knob and the rotary shaft with a friction force greater than the friction force created between the first knob and the stationary member by the first friction member so that the rotation of the first knob is transmitted to the rotary shaft without any loss. The coupling force created between the rotary shaft and the first knob by the second friction member is of such a magnitude that the first knob is movable axially of the rotary shaft by an extraneous force exerted on the first knob and that upon removal of the extraneous force the first knob may be fixed at that position.

7 Claims, 3 Drawing Figures

TORQUE ADJUSTER

BACKGROUND OF THE INVENTION

1. Field of the Invention

This invention relates to a torque adjuster adapted arbitrarily to adjust the magnitude of the torque of control means such as knobs or handles in a transmission device for transmitting the rotation of the handles through a rotary shaft to a rotatable member such as a pinion.

2. Description of the Prior Art

A torque adjuster adapted arbitrarily to adjust the magnitude of the torque of control means such as knobs or handles when a pinion is rotated by means of the control means is to be found, for example, in the operating handle portion of a microscope for vertically moving the object stage thereof. Description will therefore be made with reference to a microscope by way of example.

The torque of the control means or handles for vertically moving the object stage or the lens tube of a microscope has heretofore been adjusted to a predetermined value by the manufacturer. Thus, the user of the microscope could not readjust the torque of the operating handles to a magnitude (intensity) as he desires or a magnitude corresponding to observation. Also, on the part of the manufacturer, the adjustment of the torque of the operating control means to a predetermined value has been not only difficult, but it also required time, adjusting tools, etc.

FIG. 1 of the accompanying drawings shows a conventional driving device for the knobs for effecting longitudinal movement of the object stage of a microscope, for example, which has overcome the above-noted disadvantages. In this FIG., a stationary shaft 1 is integrally formed with an unshown microscope body. A pinion shaft 5 formed with a pinion 3 is rotatably fitted substantially centrally on the stationary shaft 1. This pinion 3 meshes with an unshown rack fixed to a vertically movable member such as an object stage or a lens tube. As shown, the pinion shaft 5 has tapered portions formed toward the opposite ends thereof, which ends are externally threaded at 7 and 9. Knobs 11 and 13 for effecting vertical movement are threadably fitted on the threads 7 and 9, respectively. The knobs 11 and 13 are also taper-coupled to the tapered portions of the pinion shaft 5.

Between the knobs 11, 13 and the stationary shaft 1, there are clearance in which friction members 15 and 17 are disposed. The friction forces resulting from the taper-coupling between the pinion shaft 5 and the knobs 11, 13 must be adjusted so as always to be greater than the friction forces between the knobs 11, 13 and the stationary shaft 1 resulting from the presence of the friction members 15 and 17. With the friction forces so adjusted, the pinion shaft 5 becomes rotatable upon rotation of the knobs 11, 13. The friction forces resulting from the taper-coupling prevent the knobs 11, 13 from being disengaged from the pinion shaft 5 even if the knobs are rotated in the direction in which they may be threadably disengaged. Adjustment of the torque output of the knobs 11, 13 may be accomplished by utilizing the resilient deformation between the pinion shaft 5 and the knobs 11, 13 in the taper-coupled portions. More specifically, the distance $L_1$ may be reduced by rotating the knobs 11 and 13 in their mutually tightening direction, whereby the friction forces between the knobs 11, 13 and the stationary shaft 1 may be increased. Thus, the torque of the knobs 11, 13 may be increased.

However, the knobs 11 and 13 are rotated for each observation so that they rub against the friction members 15 and 17, and the wear thereof is increased with time and accordingly, the torque delivered by the knobs 11, 13 is decreased. For this reason, it is attempted to increase the knob torque by reducing the distance $L_1$, but the taper-coupling between the knobs 11, 13 and the rotary shaft 5 permits the distance $L_1$ to be reduced only slightly within the range allowed for by resilient deformation of these members, and not beyond such range. Thus, adjustment of the torque output of the knobs 11, 13 becomes impossible.

SUMMARY OF THE INVENTION

I have conceived and contribute by the present invention a torque adjuster which is simply constructed arbitrarily to adjust the torque output of the knobs for rotating the rotary shaft.

According to the present invention, the torque adjuster includes a rotary shaft, a first control means such as a handle or knob fitted to the rotary shaft for rotating the same, a stationary member, and a first friction member provided between the first control means and the stationary member, the first control means being movable axially of the rotary shaft to vary the force with which the first control means urges the friction member, thereby adjusting the torque of the first control means. The diameter of the rotary shaft is uniform over a predetermined range thereof so that the first control means is freely movable axially of the rotary shaft. A second friction member is provided for coupling the first control means and the rotary shaft with a friction force greater than the friction force created between the first control means and the stationary member by the first friction member so that the rotation of the first control means is transmitted to the rotary shaft without any loss. The coupling force created between the rotary shaft and the first control means by the second friction member is of such a magnitude that the first control means is movable axially of the rotary shaft by an extraneous force exerted on the first control means and that upon removal of the extraneous force the first control means may be fixed at that position.

There has thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein.

DESCRIPTION OF THE PREFERRED EMBODIMENTS

Figure 1:
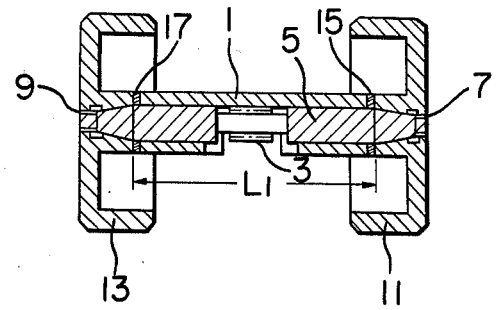
FIG. 1 shows an example of a torque adjuster according to the prior art.
Figure 2:
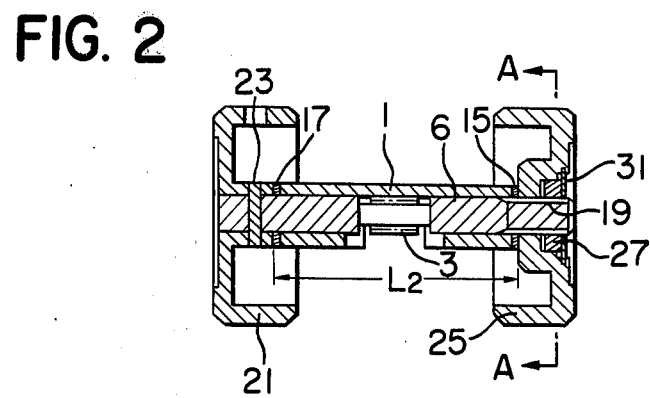
FIG. 2 shows an embodiment of the torque adjuster according to the present invention.
Figure 3:
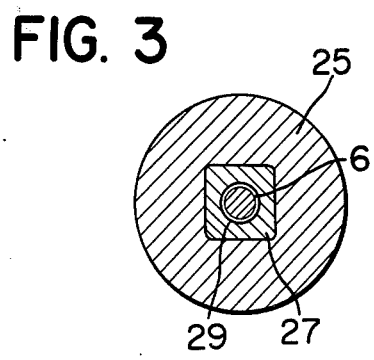
FIG. 3 is a cross-sectional view taken along line A—A in FIG. 2 and showing the essential portion of the present invention.

The present invention will now be described with respect to an embodiment thereof as shown in FIGS. 2 and 3. In this embodiment, the members identical to those in the prior art device of FIG. 1 are given similar reference numerals to those in FIG. 1. A pinion shaft 6 is rotatably fitted on the stationary shaft 1. At the left end of the pinion shaft 6, control means in the form of a handle or knob 21 is integrally coupled to the pinion shaft 6 by means of a pin 23. At the right end of the pinion shaft 6, there is formed a male screw 19 to which a female screw of a control means such as a handle or knob 25 is threadedly coupled. The knob 25 constitutes a first knob and is formed with a central, square recess, as shown in FIG. 3. A friction member 27, formed of synthetic resin such as plastic or the like, is received in this recess. The friction member 27 is formed with a central bore 29 of slightly smaller diameter than the inside diameter of the female screw of the knob 25, said bore 29 being formed at a location substantially coincident with that female screw. A snap ring 31 is provided to prevent the friction member 27 from slipping out of the knob 25.

The functions of the friction members 15 and 17 are similar to those described with respect to the prior art device of FIG. 1, and these friction members 15 and 17 together constitute a first friction member.

The procedures of coupling the knob 25 to the pinion shaft 6 are as follows. The friction member 27 similar in cross-sectional shape to the square recess formed in the knob 25 is fitted in this recess, and then the snap ring 31 is fitted into place, as shown, to seat against a shoulder provided by enlarging the recess for that purpose. In this state, the male screw 19 of the pinion shaft 6 is brought into threadable engagement with the female screw of the knob 25. Further, the knob 25 is rotated while the pinion shaft 6 remains fixed. Since the friction member 27 is integrally coupled to the knob 25 and is formed of a synthetic resin material softer than the pinion shaft 6, the male screw 19 penetrates into the bore of the friction member 27 while cutting threads in the wall of the bore. This phenomenon is called self-tapping due to which the friction member 27 and the male screw 19 of the pinion shaft 6 make contact with a great magnitude of friction force. The friction force so created between the friction member 27 and the male screw 19 is greater than the friction force created between the knobs 21, 25 and the stationary shaft 1 by the friction members 15 and 17.

The friction force between the friction member 27 and the male screw 19 is of such a magnitude that the knob 21 is manually held down and the other knob 25 can be rotated. This friction force is also of such a magnitude that the knob 25 and the pinion shaft 6 can be rotated together even if the knob 25 is rotated in the direction to release the threadable coupling between the female screw of the knob 25 and the male screw 19.

Thus, by manually holding down the knob 21 and rotating the other knob 25, the distance $L_2$ between the two knobs may be varied and accordingly, adjustment of the torque output of the knobs 21 and 25 may be accomplished arbitrarily and easily.

Actually, the threaded coupling between the friction member 27 and the male screw 19 of the pinion shaft 6 may conveniently be designed in such a direction that they are tightened together when the vertically movable object stage or lens tube is upwardly moved with rotation of the pinion 3. That is, it may be designed such that when the pinion shaft 6 is rotated against the force exerted on the pinion 3, the knob 25 advances toward the stationary shaft 1 along the male screw 19. Such design has an advantage that even some extent of reduction in the friction force between the friction member 27 and the male screw 19 affects the actual operation in no way. This has become possible by fixing one knob 21 to the pinion shaft 6 and coupling the other knob 25 to the pinion shaft through the friction member 27, as in the above-described embodiment.

The present invention is also applicable to devices having only one knob. Further, the present invention is not restricted to the coupling between the pinion shaft for rotating the pinion and the knob, but is widely applicable to the coupling between a rotary shaft and a knob.

The shape of the recess for stopping rotation of the friction member 27 is not restricted to the square shape, but may be triangle, pentagon or any other polygon.

According to the present invention, as has been described above, the torque output of the knobs may readily and arbitrarily be adjusted by a simple construction.

I believe that the construction and operation of my novel torque adjuster will now be understood and that the advantages thereof will be fully appreciated by those persons skilled in the art.

I claim:

1. A torque adjuster including a rotary shaft having a diameter which is uniform over a predetermined range thereof, control means comprising a manually rotatable first knob fitted to said rotary shaft for rotating the same, a stationary member, and a first friction member provided between said control means and said stationary member, said control means being movable axially of said rotary shaft to vary the force with which said control means urges said friction member, thereby adjusting the torque of said control means; a second friction member for coupling said control means and said rotary shaft with a frction force greater than the friction force created between said control means and said stationary member by said first friction member so that the rotation of said control means is transmitted to said rotary shaft without loss; the coupling force created between said rotary shaft and said control means by said second friction member being of such a magnitude that said control means is movable axially of said rotary shaft by an extraneous force exerted thereon and that upon removal of said extraneous force said control means be fixed at its last position; and coupling means for coupling together said first knob and said second friction member, said second friction member being formed of a synthetic resin material, said rotary shaft having a male screw at one end thereof, and said second friction member threadedly engaging the male screw of said rotary shaft by self-tapping by means of rotation of said knob.

2. A torque adjuster according to claim 1, wherein said first knob has a female screw substantially centrally thereof for threaded engagement with the male screw of said rotary shaft, said second friction member has a slightly smaller opening than the inside diameter of the female screw of said first knob and is coupled to said first knob so that the position of said opening is coincident with the female screw formed on said first knob, and said friction member is self-tapped in the male screw of said rotary shaft by the guide of said female screw provided on said first knob.

3. A torque adjuster according to claim 2, wherein said rotary shaft is a pinion shaft adapted to mesh with and rotate a pinion.

4. A torque adjuster according to claim 3, wherein the direction of threaded engagement between the male screw of said pinion shaft and the female screw of said first knob is selected such that they are tightened together when said first knob is rotated against a force exerted on said pinion.

5. A torque adjuster according to claim 2, wherein said first knob has a polygonal recess therein, said second friction member is similar in shape to said recess in said first knob, and said coupling means causes said second friction member to fit in said recess in said first knob.

6. A torque adjuster according to claim 3, wherein said pinion shaft has its pinion fixed substantially centrally thereon, and has said first knob at one end thereof and a second knob at the other end thereof, said second knob being integrally coupled to said pinion shaft.

7. A torque adjuster according to claim 6, wherein the diameter of threaded engagement between the male screw of said pinion shaft and the female screw of said first knob is selected such that they are tightened together when said first knob is rotated against a force exerted on said pinion.

* * * * *